O. CZARAN.
MOWING MACHINE.
APPLICATION FILED MAY 17, 1911.
1,027,643.
Patented May 28, 1912.
2 SHEETS—SHEET 1.
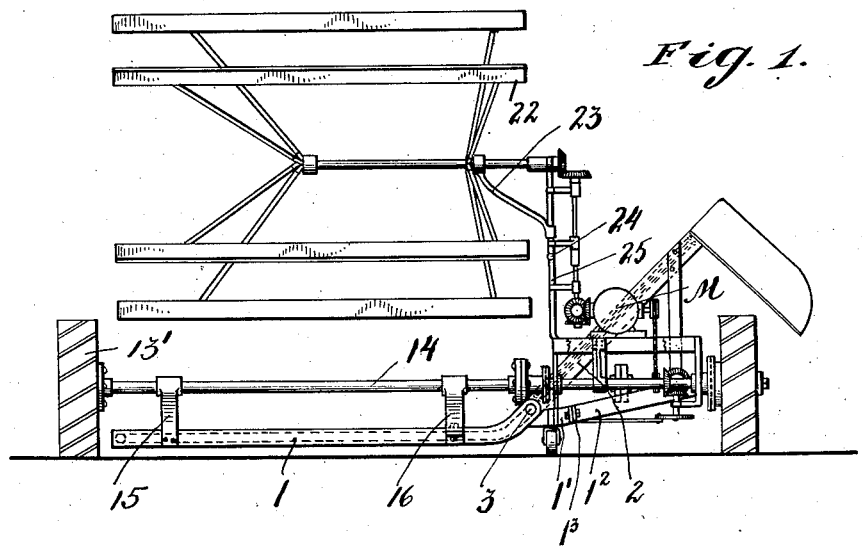
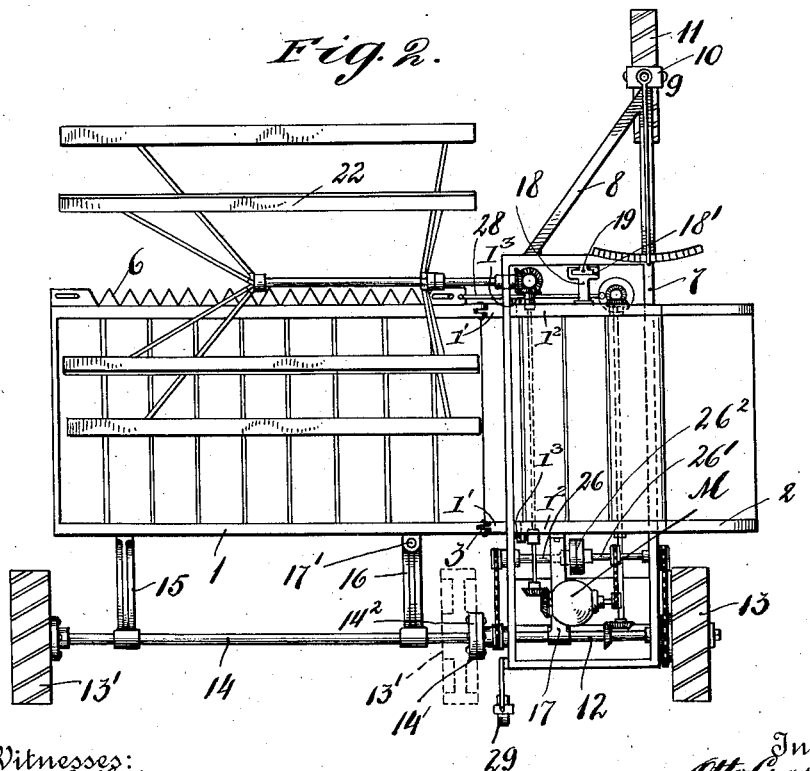
Witnesses:
Harry C. Heibig
H. Brockman.
Inventor
Otto Czaran
By his Attorney

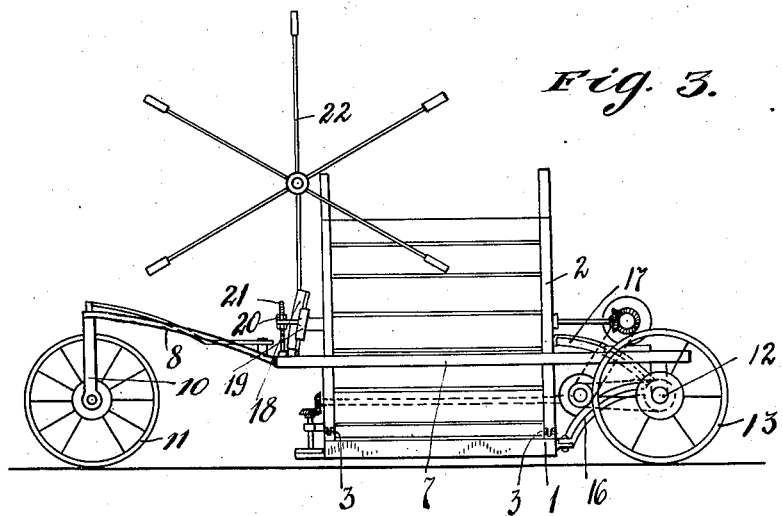
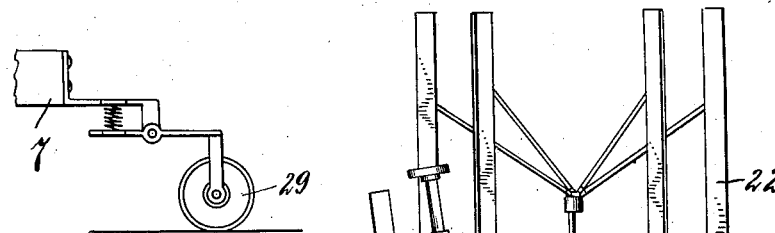
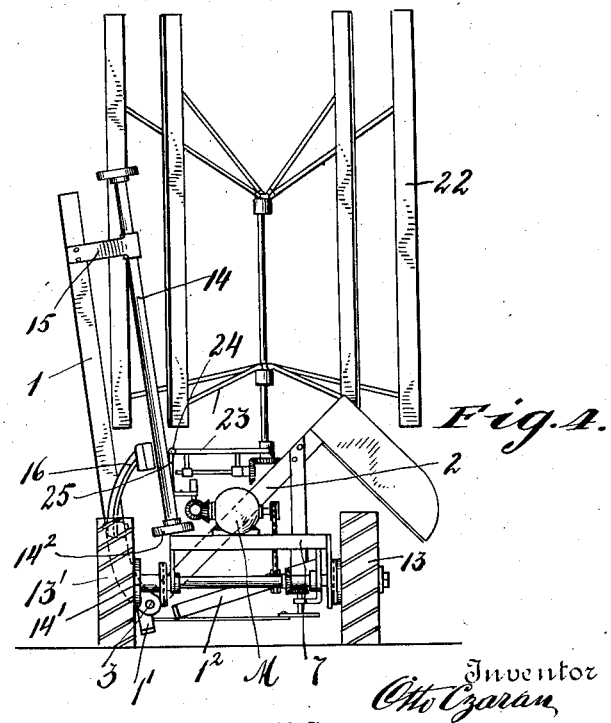

UNITED STATES PATENT OFFICE.

OTTO CZARAN, OF GLENDALE, NEW YORK.

MOWING-MACHINE.

1,027,643.  Specification of Letters Patent.  Patented May 28, 1912.

Application filed May 17, 1911. Serial No. 627,738.

*To all whom it may concern:*

Be it known that I, OTTO CZARAN, a subject of the Emperor of Austria-Hungary, residing at Glendale, Long Island, in the county of Queens and State of New York, have invented certain new and useful Improvements in Mowing-Machines, of which the following is a specification.

The present invention pertains to mowing machines and has for its principal object to so construct the same so as to enable of their being propelled and at the same time operated by motor power.

Another object of my invention is to provide a construction enabling the machine being folded up to render it easily transportable on narrow roads.

With these and other objects in view, my invention consists in the construction, combination and arrangement of parts as hereinafter fully specified and claimed.

In the accompanying drawing, which forms a part of this specification, and in which similar reference numerals denote corresponding parts, Figure 1 is a rear elevation of the mowing machine in operative position; Fig. 2 is a top plan view thereof; Fig. 3 is a side elevation; Fig. 4 is a rear elevation of the folded mowing machine, ready for transport and Fig. 5 is a detail.

The mowing machine comprises a frame supporting the grain carrier or elevator and constructed of two sections 1, 2 pivoted together at 3 so that the frame section 1 may be lifted into the position shown in Fig. 4. The section 1 has the usual extension for the elevator, which I also make of two sections 1', 1², each formed with flanges 1³ to be rigidly joined when the frame is in operative position and to be detached prior to the lifting of the section 1 into the position shown in Fig. 4. The grain carrier or elevator being of ordinary construction, as for instance, of the type used in the well known McCormick mowing machines and not forming a part of my invention, I shall not enter into the details thereof.

Along the front longitudinal edge of the section 1 of the elevator frame are arranged in well known manner the ordinary reciprocatory knives 6. The elevator frame is arranged on a transport truck 7 substantially of rectangular shape, which is formed in front with a triangular extension 8. The apex 9 of this triangular extension carries a bifurcated frame 10 in which a single wheel 11 constituting the steering wheel of the truck is supported. Suitable means may be provided for the steering of the said wheel and for securing it in the direction of travel. At the rear of the frame 7 a shaft 12 is rotatively mounted transversely thereto which at one end loosely carries a truck wheel 13 and at the opposite end is provided with a flange 14' or other suitable means to enable the removable attachment of the other truck wheel 13' when the machine is folded up for the transport (see dotted lines Fig. 2). When the machine is unfolded for use the wheel 13' is removed and instead a spindle 14 having a corresponding flange 14² or other suitable means is fixed to the spindle 12 in linear extension of the latter, and the second truck wheel 13' is fixed to the free end of said extension (see full lines in Fig. 2). The elevator frame is provided at its rear with several curved arms 15, 16, 17 supporting the spindle 14 and formed with suitable bearing therefor. These arms may be all rigidly fixed to the frame or may be supported on pivots 17' to be capable of being swung horizontally on the removal of the spindle 14 prior to folding up the machine. On the opposite side, the elevator frame is provided with one or more curved arms 18, the center of their curvature being the axis of the shaft 12, which are provided with suitable guide grooves 18'. Opposite thereto guide members 19 project from the truck frame slidably engaging the guide grooves 18' of said arms and permitting of the elevator frame being swung either up or down around the shaft 12 in order to adjust the position of the knives according as the grain is to be cut at a higher or lower point. The adjustment of the frame around the shaft 12 may be accomplished by any suitable means, as for instance, a nut 20 working on a stationary screw 21 (Fig. 3). In front of the elevator frame, the reel 22 is supported in well known manner in a frame 23, which for the purpose of permitting it of being swung upward into the position shown in Fig. 4, when the machine is folded up, is pivoted at 24 to a stationary part 25 projecting from the truck.

The propulsion of the truck, the operation of the knives, the reel and other operative members of the machine, is accomplished by a suitable motor M arranged at the rear end of the truck from which motion is transmitted by suitable transmission means to the truck wheels, etc. In order to allow of the truck turning easily around a corner, I provide the following arrangement:

Parallel to the wheel shaft 12 is a sectional spindle 26, 26' the two sections of which are coupled by means of a suitable friction coupling 26². The motor shaft is connected by suitable gears to one of the sections, as 26', of said spindle and said section in its turn is operatively connected to the loose truck wheel 13. The other section 26' of the sectional spindle is connected by suitable transmission gears to the main truck shaft 12. It will be seen that when the truck is steered to turn around one of the truck wheels, say wheel 13', the wheel 13 will continue to revolve while the wheel 13' remains stationary.

The means 28 whereby reciprocating motion is transmitted from the motor by suitable gears to the knives may be so connected to the knife mechanism that it will not interfere with the folding of the section 1 and the adjustment of the elevator around the spindle 12.

At the rear, the truck frame is provided with an auxiliary truck wheel 29 which is yieldingly supported in the truck, as for instance, by means of a spring actuated frame (Fig. 5) and which wheel is designed to support the rear of the machine, particularly when the latter is unfolded or in the position shown in Fig. 2.

I do not wish to limit myself to the particular construction described and shown, since various modifications may be made by those skilled in the art without departing from the spirit of my invention.

What I claim and desire to secure by Letters Patent is:

1. In a mowing machine, the combination with a truck, of an elevator frame, a knife mechanism carried by and arranged longitudinally of one side of said elevator frame, means at the opposite side of the latter for pivotally connecting the said elevator frame to the said truck, so as to allow the elevator frame of being tilted on a transverse axis to raise and lower the knife mechanism with respect to the ground, an adjustable guide member carried by the truck and a sector shaped guide member carried by the said elevator frame, both said members movably engaging with one another and serving to guide the said elevator frame in the said tilting movement.

2. In a mowing machine, the combination with a truck, of an elevator frame composed of two sections foldable upon one another, a knife mechanism carried by and arranged longitudinally of one side of one section, means at the opposite side of the said sectional frame for pivotally connecting the said elevator frame to the truck to allow the elevator frame of being tilted on a transverse axis to raise and lower the knife mechanism with respect to the ground and means for guiding the frame in the said tilting movement.

3. In a mowing machine, a foldable elevator frame, a truck supporting said frame and onto which the latter is to be folded, a shaft for the rear truck wheels, a removable extension for said shaft, means for connecting the said extension to the said shaft, means supporting said extension in the elevator frame, and a truck wheel capable of being interchangeably fixed to the said shaft and to the extension thereof respectively.

In testimony whereof I affix my signature in presence of two witnesses.

OTTO CZARAN.

Witnesses:
ELLIS V. LEVY,
OTTO PRIX.